(No Model.)

G. J. RECORD.
DEVICE FOR OPENING CANS.

No. 555,334.          Patented Feb. 25, 1896.

WITNESSES
Severance
C. D. Davis

INVENTOR
Geo. J. Record
by W. H. Babcock
Attorney.

UNITED STATES PATENT OFFICE.

GEORGE JOHN RECORD, OF CONNEAUT, OHIO.

DEVICE FOR OPENING CANS.

SPECIFICATION forming part of Letters Patent No. 555,334, dated February 25, 1896.

Application filed January 2, 1896. Serial No. 574,167. (No model.)

*To all whom it may concern:*

Be it known that I, GEORGE JOHN RECORD, a citizen of the United States, residing at Conneaut, in the county of Ashtabula and State of Ohio, have invented certain new and useful Improvements in Devices for Opening Cans; and I do hereby declare the following to be a full, clear, and exact description of the invention, such as will enable others skilled in the art to which it appertains to make and use the same.

The object of this invention is to utilize the bail of a can or similar receptacle or inclosure for withdrawing the cover, and in particular to provide the bail with a fulcrum, preferably formed in it, which permits the use of a lever to lift out a tightly-fitting cover or cap.

Figure 1:
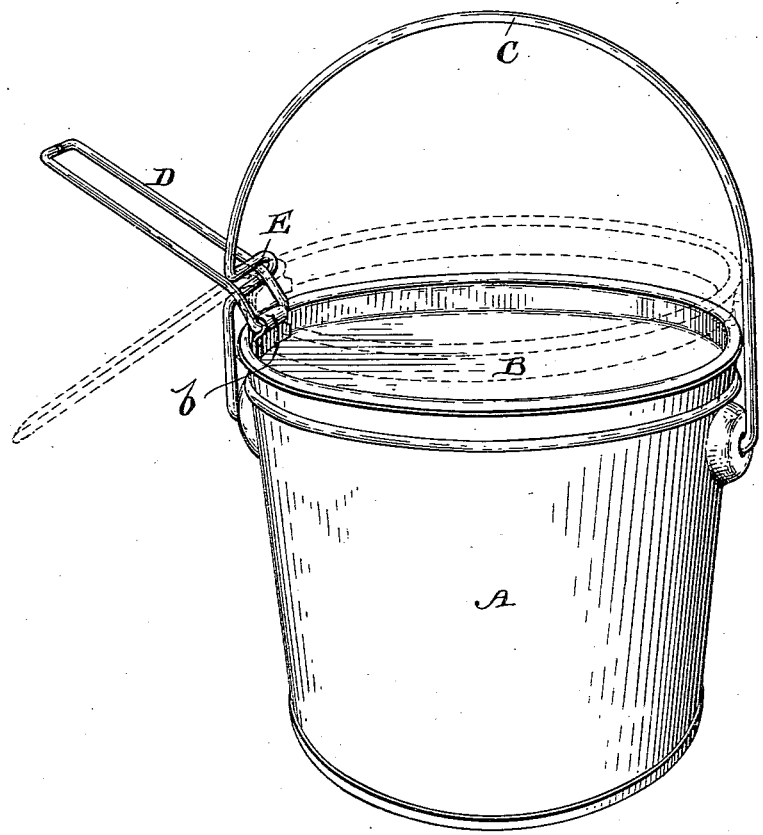
Figure 2:
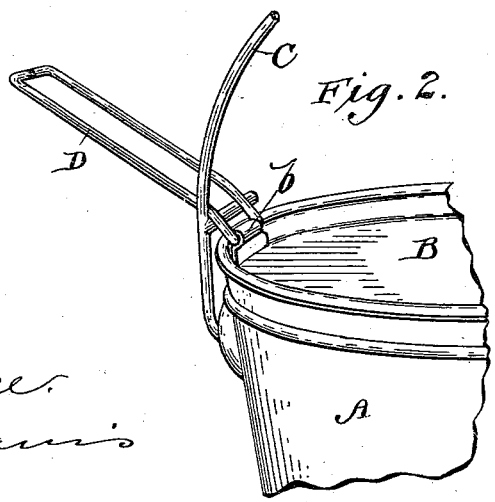

In the accompanying drawings, Figure 1 represents a perspective view of a closed can provided with a bail and lever embodying my invention, these parts being arranged in position for opening it by raising the cover; and Fig. 2 represents a detail view of a bail slightly modified in form.

A designates the body of the can; B, the cover tightly fitted into the same; C, the bail, and D the lever. In the said bail, on one side of the can and a little above its edge, is formed, as shown in Fig. 1, a bend or offset E, having a narrow U shape, which receives the said lever and the lower part of which serves as a fulcrum therefor. This lever is arranged to engage and lift the said cover when its outer end is depressed, the position of the parts being as described. It preferably consists of a wire rod passed through an eye *b*, which is attached to the cover at or near its periphery, the said rod being bent into the form of an elongated link, as shown. When the can is to be stored or shipped, the said handle folds down into the depressed middle part of the cap or cover and the bail turns down in the usual manner on the outside. When it is to be carried without opening, the bail is of course held in the hand and the lever is left folded down, as stated. When the can is to be opened, the bail is turned back sufficiently to allow the lever to be turned outward into the position shown in full lines in Fig. 1 and then brought forward to present the fulcrum for the said lever. A pressure on the outer end of the latter will lift the said cover from its seat, the said cover and lever thereby assuming the position shown in dotted lines in Fig. 1. This is of course only one form of embodiment of my invention, which includes any devices whereby a bail is utilized in raising a can-cover.

As shown in Fig. 2, the fulcrum may be a straight lateral bar with nothing above it, and obviously many other changes may be made without departing from the spirit and scope of my invention.

Having thus described my invention, what I claim as new, and desire to secure by Letters Patent, is—

1. In combination with the body and cover of a receptacle, a movable bail and means connected to the cover and arranged to act with the said bail for lifting the said cover, although allowing the said bail to remain upright substantially as set forth.

2. In combination with the body and cover of a receptacle, a movable bail and means arranged to act on the said bail for lifting the said cover while leaving the said bail upright substantially as set forth.

3. In combination with a can and tightly-fitting cap or cover, a lever arranged to act on the said cap or cover for removing the same and a bail provided with a fulcrum for the said lever substantially as set forth.

4. A pivoted bail having a U-shaped offset formed in one side for a fulcrum, in combination with a lever which is arranged to enter the said U-shaped offset and a cap or cover which is engaged and lifted by the said lever substantially as set forth.

5. In combination with a can body and cover, a lever attached to the said cover and arranged to fold down on the same, and a bail provided with a fulcrum for the said lever to aid in lifting the said cover substantially as set forth.

In testimony whereof I affix my signature in presence of two witnesses.

GEORGE JOHN RECORD.

Witnesses:
MARY J. RECORD,
WM. H. BABCOCK.